INVENTOR
Everett Eberhard
BY J. L. Whittaker
ATTORNEY

Aug. 11, 1953 E. EBERHARD 2,648,766

PULSE WIDTH DISCRIMINATOR

Filed April 19, 1950 3 Sheets-Sheet 2

INVENTOR
Everett Eberhard
BY J. L. Whittaker
ATTORNEY

PULSE WIDTH DISCRIMINATOR

Filed April 19, 1950 3 Sheets-Sheet 3

INVENTOR
Everett Eberhard
BY J. L. Whittaker
ATTORNEY

Patented Aug. 11, 1953

2,648,766

UNITED STATES PATENT OFFICE 2,648,766

PULSE WIDTH DISCRIMINATOR

Everett Eberhard, Haddonfield, N. J., assignor to Radio Corporation of America, a corporation of Delaware Application April 19, 1950, Serial No. 156,881

5 Claims. (Cl. 250—27)

My invention relates to pulse width discriminator circuits and particularly to circuits designed to pass electrical pulses having a width greater than a lower width limit and less than an upper width limit.

One object of the invention is to provide improved means for discriminating between electrical pulses of different widths or durations.

Another object of the invention is to provide an improved means for passing electrical pulses having widths within a certain range of widths to the exclusion of pulses having either less width or greater width than those included in said range.

In practicing the invention, the electrical pulses are differentiated and applied to a circuit which will pass the differentiated back edge of a pulse when and only when a selecting or control pulse is being applied to said circuit. This control pulse preferably is delayed sufficiently so that it starts after the termination of the differentiated front edge of the pulse.

In a preferred embodiment of the invention the differentiated back edge of a pulse can pass through a grid-controlled tube only if selecting or control voltages which are applied to two of the tube electrodes permit the tube to pass current at the instant the back edge differentiated pulse occurs. The timing of the two selecting or control voltages is determined by two delay means which, in one example, are two delay lines. In another example, the two delay means are a delay line and a tuned circuit.

The invention will be better understood from the following description in which.

In the several figures of the drawing similar parts are referred to by similar reference characters.

Figures 1, 2, 3:
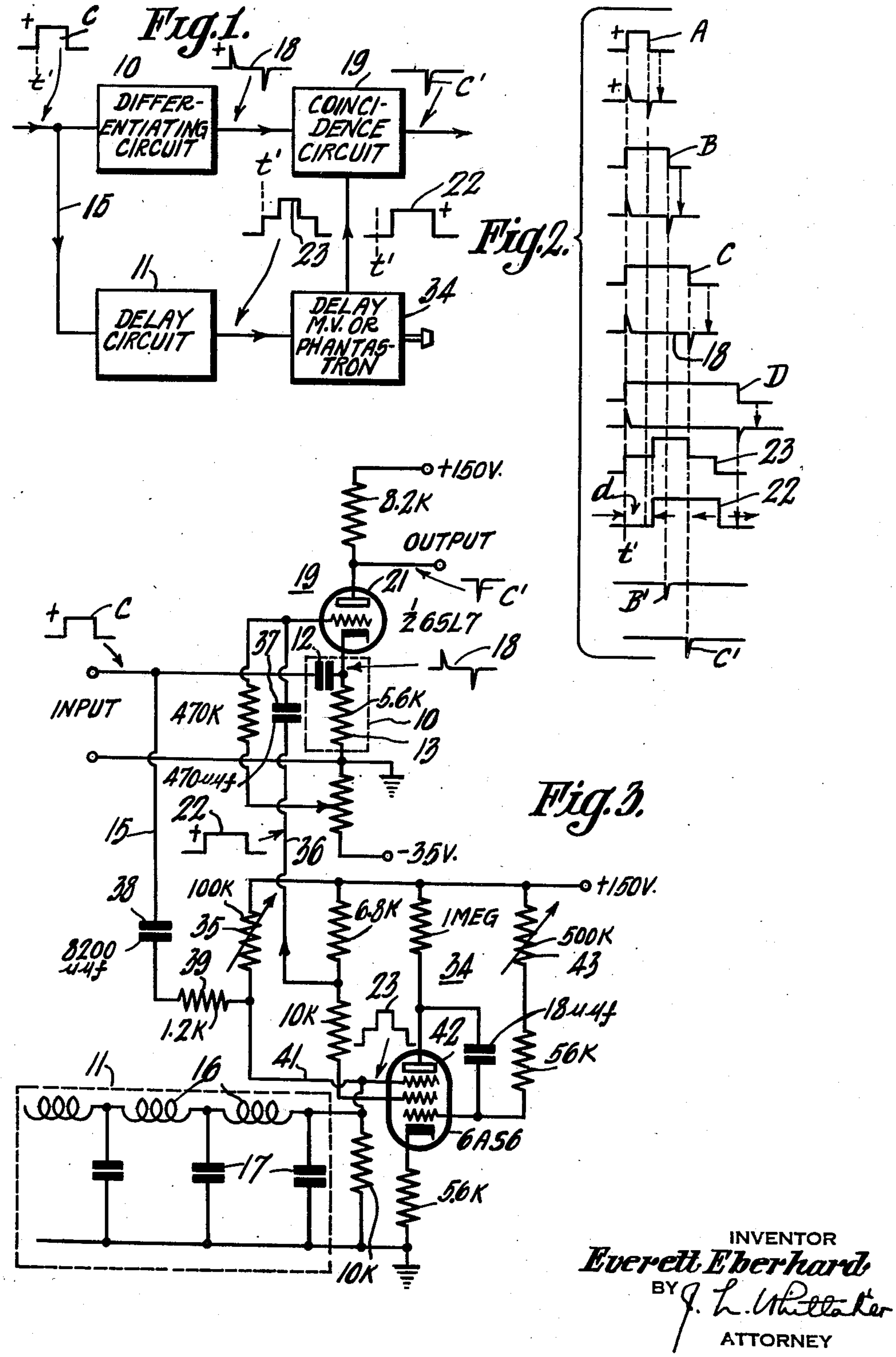
Fig. 1 is a block diagram illustrating one embodiment of the invention.
Fig. 2 is a group of graphs illustrating the operation of the circuit shown in Fig. 1.
Fig. 3 is a circuit diagram illustrating one specific circuit that may be employed for the embodiment of Fig. 1.

Referring to the embodiment of the invention shown in block diagram in Fig. 1 and in detail, by way of example, in Fig. 3, the input pulses are applied to a differentiating circuit 10 and over a conductor 15 to a delay circuit 11. In Fig. 3 the differentiating circuit comprises capacitor 12 and resistor 13; the delay circuit 11 is an open-ended reflecting delay line comprising series inductors 16 and shunt capacitors 17.

The input pulses are periodically recurring pulses of positive polarity in the instant example, as indicated by the pulse C. Fig. 2 shows several pulses of different widths, these being the pulse C, which is of a width to be passed by the discriminator circuit, another pulse, which is identified as pulse B, of a different width that will be passed, a pulse A that is too narrow to be passed, and a pulse D that is too wide to be passed.

The differentiated pulses 18 from circuit 10 are applied to a coincidence tube or circuit 19. As shown in Fig. 3, the coincidence circuit may comprise a three element vacuum tube 21 to the cathode of which the differentiated pulses are applied. Thus the negative polarity trailing edge pulse of pulses 18 drives the cathode of tube 21 in the direction to make it pass signal. However, the tube 21 is biased so it cannot pass signal until a selecting or control pulse is applied with positive polarity to the grid of tube 21.

Such a control pulse is shown at 22. It may be obtained by applying the delayed pulse, indicated at 23, from the delay circuit 11 to a suitable circuit such as a delay multivibrator or a phantastron 34. In the example of Fig. 3 the control pulse 22 is taken off the phantastron 34 by way of a lead 36 and a coupling capacitor 37 and applied with positive polarity to the grid of the coincidence tube 21.

The pulse discrimination operation will be apparent from the graphs in Fig. 2. For the case of pulse A the second step in the wave shape at 23 will not be obtained. Hence the phantastron will not fire for pulse A and no control pulse 22 will be obtained. Therefore, pulse A produces no output pulse in the coincidence tube output circuit. The pulse D is so wide that its differentiated back edge pulse occurs after the control pulse 22 terminates. Therefore, pulse D is not passed by the concidence circuit 19.

Pulses B and C, on the other hand, are of such width that their back edges occur during the occurrence of the control pulse 22 with the result that the differentiated back edge pulses B′ and C′ pass through the coincidence circuit.

Referring more specifically to the particular example of Fig. 3, the input pulses, such as pulse C, are applied by way of the conductor 15, a coupling capacitor 38, an isolating resistor 39 and a conductor 41 to the input end of the delay line 11. This end of the delay line is also connected to the suppressor grid of a pentode 42 which is the tube of the phantastron circuit.

The pulse C passes down the delay line 11 and is reflected back with unchanged polarity. If the time of travel down the line and back is less than the duration of the pulse C, which is the condition assumed here since pulse C is to be passed, then the direct pulse and the reflected pulse add to give the pulse 23 having a double amplitude portion. This double voltage is sufficient to trigger the phantastron whereas the voltage of the pulse C itself is not sufficient to trigger it.

The triggering voltage level for the phantastron may be adjusted by means of the variable resistor 35.

It will be apparent that if the applied input pulses, such as a pulse A, are too narrow, the pulse 23 will not have a double voltage portion and, therefore, the phantastron will not be triggered. Thus, the delay line 11 determines the pass limit at the narrow width limit.

The phantastron circuit itself comprising the tube 42 and associated resistor-capacitor circuits is well known in the art and need not be described in detail. A description of the phantastron circuit may be found in Electronics for May 1946, pages 142 and 143.

The back edge of the control pulse 22 may be adjusted to widen or narrow the pulse for the purpose of setting the pulse width pass limit at the wide width limit. This adjustment may be made by means of the variable resistor 43. In the example shown in Fig. 2, the back edge of pulse 22 has been made to occur after the back edge of pulse C but before the back edge of pulse D. Thus pulse D will not be passed, pulse A will not be passed as previously explained, but pulses B and C will be passed in the form of back edge pulses B′ and C′.

Figures 4, 5, 6:
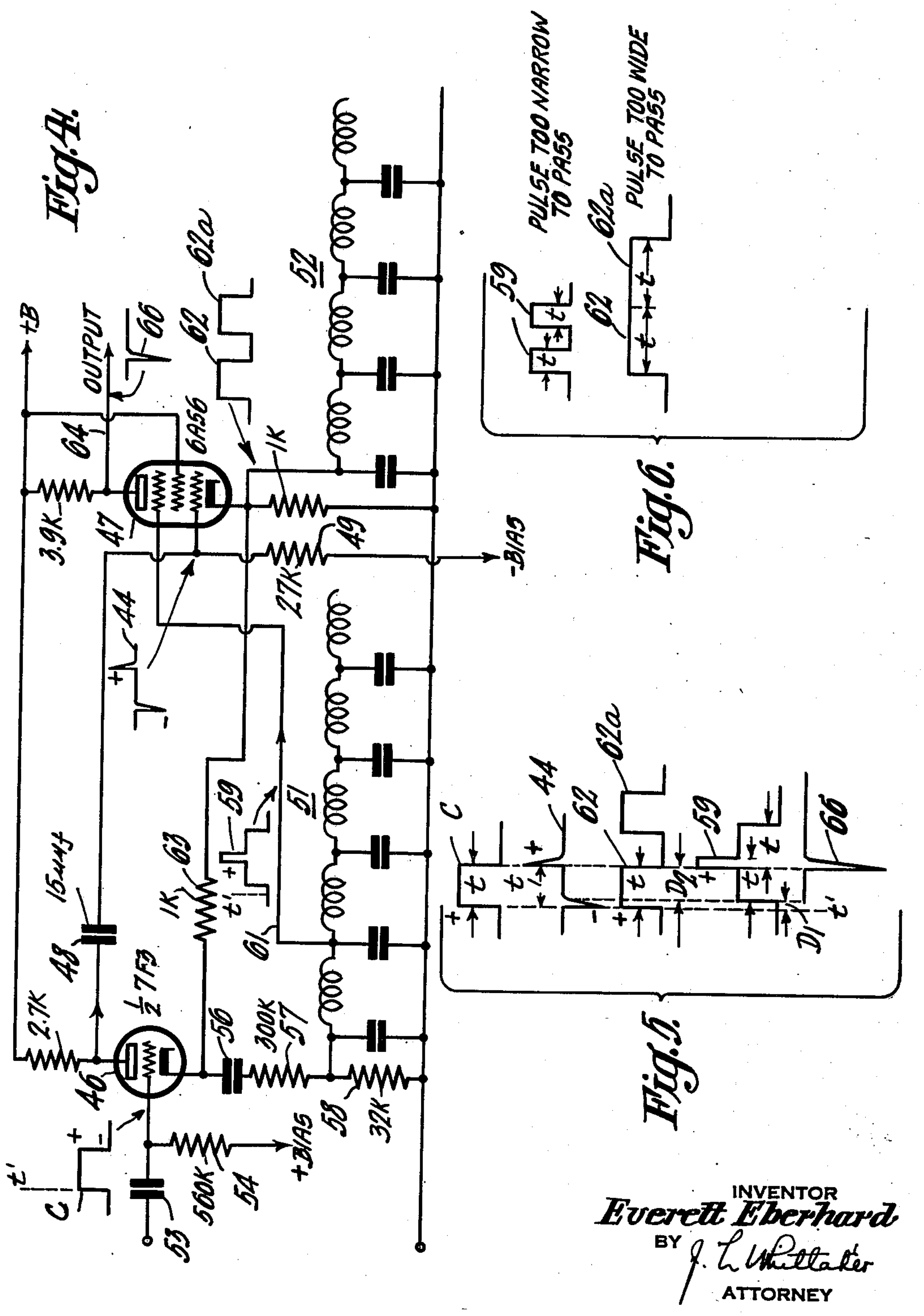
Fig. 4 is a circuit diagram of one preferred embodiment of the invention.
Figs. 5 and 6 are groups of graphs that are referred to in explaining the operation of the circuit of Fig. 4.
Figure 7:
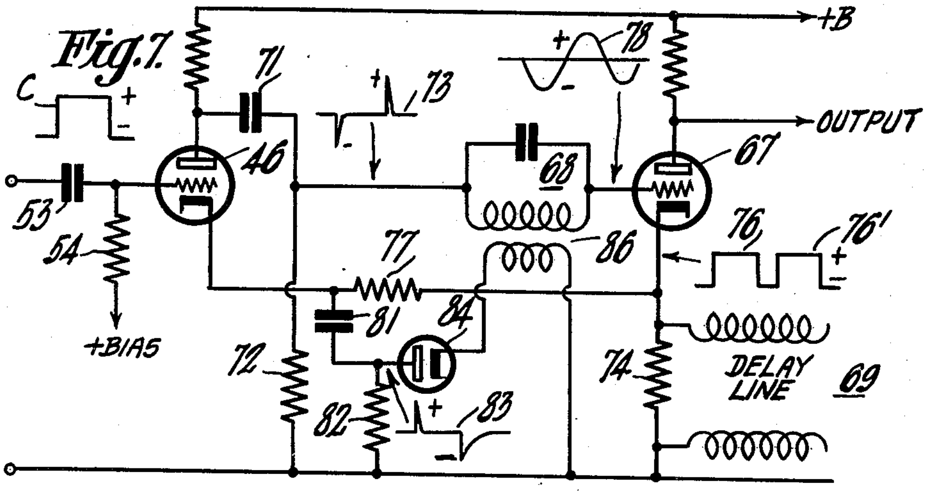
Fig. 7 is a circuit diagram of another preferred embodiment of the invention.

Figs. 4 and 7 illustrate two preferred embodiments of the invention. In each of these embodiments there must be coincidence of three voltage conditions before a pulse is passed by the discriminator circuit. Therefore, these embodiments give better pulse selection than does the embodiment of Figs. 1 and 3 where coincidence of only two voltage conditions is required.

Referring to Fig. 4, the pulse width discriminator circuit comprises a vacuum tube 46, a pentode 47 which functions as a coincidence tube, a differentiating circuit comprising a capacitor 48 and a resistor 49; a delay line 51 in the cathode circuit of tube 46 for setting the narrow width limit, and a delay line 52 in the cathode circuit of tube 47 for setting the wide width limit.

The input circuit of the tube 46 includes a coupling capacitor 53 and a grid resistor 54.

The anode circuit of tube 46 supplies the pulses C with reversed polarity to the differentiating circuit 48, 49 whereby the differentiated pulses 44 are applied to the control grid of the coincidence tube 47. It will be noted that the back edge pulse drives said control grid more positive.

The cathode circuit of tube 46 includes a coupling capacitor 56, an isolating resistor 57 and a resistor 58 across which the delay line 51 is connected. The resistor 58 matches the impedance of delay line 51 at least approximately. Thus, the voltage pulse C is applied to the delay line 51 with the original positive polarity and it passes down the delay line and is reflected back with unchanged polarity.

A control pulse 59 of positive polarity is taken off a point on the delay line 51 by a conductor 61 and applied to the suppressor grid of the coincidence tube 47. As shown by the graphs in Fig. 5, the pulse 59 is delayed an amount $D_1$, by the first section of line 51 so that the pulse 59 does not tend to open up the coincidence tube 47 during the occurrence of the differentiated front edge pulse (the negative portion of wave 44). More important, the delay $D_1$ sets the delayed pulse 59 (as it appears at conductor 61) under the differentiated back edge pulse (the positive portion of wave 44). The importance of this will appear below.

In the example shown in Fig. 5 where the pulse C is to be passed by the coincidence tube 47, the pulse 59 rises to double amplitude since the pulse C goes down the line 51 and back before the delayed pulse C being applied to conductor 61 terminates. Since the latter portion of delayed pulse C occurs during the positive back edge pulse of wave 44, the result is that the double amplitude portion of control pulse 59 occurs during said positive back edge pulse.

It will be seen that the circuit so far described applies two voltages to the coincidence tube 47 to make it pass a pulse when of the proper width, i. e., the differentiated back edge pulse applied to the control grid, and the double amplitude portion of pulse 59 applied to the suppressor grid.

However, another control voltage condition is required to make the tube 47 pass a pulse, since the tube 47 is biased so that coincidence of the back edge pulse and the double voltage pulse 59 is not enough to open up the coincidence circuit so long as a positive control pulse is being applied to the cathode of tube 47 as described below. The negative bias for this purpose is applied through resistor 49 to the control grid.

The above-mentioned control voltage at the cathode is a pulse 62 that is applied to the cathode of the coincidence tube 47 from the cathode circuit of tube 46 by way of an isolating resistor 63. The pulse 62 corresponds to the input pulse C and is of positive polarity. Therefore, until the termination of pulse 62 it is holding the cathode of tube 47 in the positive direction to keep the tube non-conducting. The pulse 62 terminates just as the positive back edge pulse (wave 44) starts and thus takes the positive voltage off the cathode.

It will now be seen that for the condition illustrated, in Fig. 5 there is the following coincidence of voltages at the tube 47: (1) the differentiated back edge pulse (wave 44) makes the control grid more positive, (2) the double voltage pulse 59 makes the suppressor grid more positive, and (3) the termination of pulse 62 causes the cathode to go less positive. As a result, the tube 47 becomes conducting and passes the differentiated back edge pulse of input pulse C so that it appears on the output lead 64 as a pulse 66.

It will now be apparent that if the input pulses applied to the grid of tube 46 are narrower than the lower predetermined width limit they will not be passed by tube 47 and that if they are wider than the upper predetermined width limit they also will not be passed. The delay line 51 determines the lower limit because if the pulses are too narrow there will be no double voltage portion in the pulse 59 being applied to the suppressor grid. This is illustrated in Fig. 6. The delay line 52 determines the upper limit because if the pulses are too wide the reflected pulse from line 52 will return to the cathode of tube 47 before the applied pulse terminates and the cathode potential will not drop so as to open up the tube. This is illustrated in Fig. 6 where the reflected pulse 62a is shown as appearing at cathode end of line 52 just as the pulse 62 terminates.

In Figs. 3 and 4 the values of some of the circuit elements are indicated merely by way of example. These values are given in thousands of ohms, megohms, and micro-microfarads.

Fig. 7 illustrates another embodiment of the invention which operates on the same general principle as the circuit of Fig. 4. The coincidence circuit comprises a triode 67. A ringing circuit 68 performs the same function as the delay line 51 of Fig. 4, i. e., it determines the lower pulse width limit. A delay line 69 performs the same function as delay line 52 of Fig. 4, i. e., it determines the upper pulse width limit.

Figure 8:
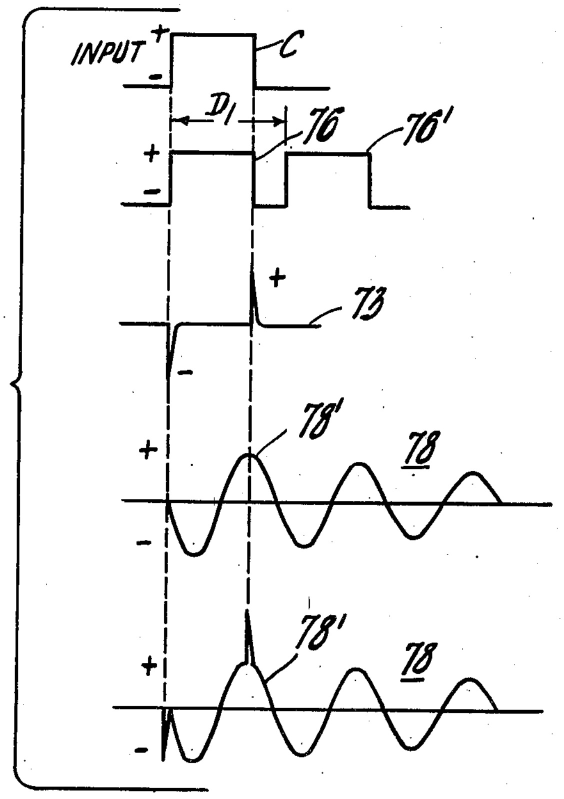
Fig. 8 is a group of graphs that are referred to in explaining the operation of the circuit of Fig. 7.

The input pulse C appears with reversed polarity at the anode of tube 46 and is differentiated by the differentiating circuit comprising a capacitor 71 and a resistor 72. The differentiated signal 73 comprises front and back edge pulses of negative and positive polarities, respectively, as shown in Figs. 7 and 8. The differentiated pulses 73 are applied by way of a conductor 74 and the ringing circuit 68 to the control grid of tube 67. Thus, the back edge positive pulse tends to make the tube 67 conducting. However, tube 67 is sufficiently biased off, by current flow through its cathode resistor 74, so that it cannot conduct until the control grid is made still more positive by a control pulse and until a positive control pulse voltage 76 is removed from its cathode.

The control pulse 76 at the cathode is obtained by taking the pulse C from the cathode of tube 46 by way of an isolating resistor 77. This pulse is applied both to the cathode of tube 67 and to the delay line 69. The line 69 is open-ended and reflects the pulse back with unchanged polarity, the reflected pulse being indicated at 76′. The cathode resistor 74 terminates the line 67 in approximately the line characteristic impedance.

Referring to Fig. 8, it will be seen that unless the input pulse is too wide the control pulse 76 terminates just prior to the occurrence of the positive back edge pulse of wave 73. Thus the tube 67 tends to open up. However, the additional control pulse produced by the ringing circuit 68 is required before the tube 67 will be opened to pass a pulse.

This control pulse from the ringing circuit 68 is the first positive half cycle 78′ of a damped sine wave 78 as shown in Figs. 7 and 8. The wave 78 is obtained by applying the pulse appearing at the cathode of tube 46 (corresponding to pulse C) to a differentiating circuit comprising a capacitor 81 and a combination of resistor 82 and the parallel impedance of diode 84 and coil 86. The differentiated front and back edge pulses appear as shown by wave 83.

The wave 83 is applied through a diode 84 to a coil 86 which is coupled to the ringing circuit 68. Only the positive front edge pulse passes through the diode 84 to kick circuit 68 into oscillation. The resulting oscillation is the wave 78.

The ringing circuit 68 is tuned to the proper frequency so that the half cycle 78′ occurs during a period that will include the back edges of the various width pulses to be passed. It will be apparent from Fig. 8 that the back edge of the pulse C may occur earlier or later by a substantial amount and still occur within substantially the peak portion of half cycle 78′.

It will be seen that the voltage applied to the grid of tube 67 is the ringing circuit damped wave plus the differentiated pulses 73. This combined wave is shown by the bottom graph in Fig. 8.

An inspection of Fig. 8 shows that the positive back edge pulse of wave 73 will be passed by the tube 67 as a pulse 87 since the following condition exists: (1) at the time of occurrence of the positive back edge pulse of wave 73 the control voltage 78′ drives the control grid of tube 67 still more positive and (2) the positive control pulse 76 at the cathode of tube 67 has terminated.

If the input pulses are too narrow they will not be passed because the back edge pulse will occur prior to the occurrence of the control half cycle or pulse 78′. If the input pulses are too wide they will not be passed because the control pulse on the cathode of tube 67 will not terminate before the back edge pulse of wave 73 occurs, this action being the same as in the circuit of Fig. 4. For example, if the time down the delay line 69 and back is $D_1$ as indicated in Fig. 8, and if the pulse C has a width $D_1$ or greater, then the delayed pulse 76′ will appear at the cathode of tube 67 at the same time as or before the pulse 76 terminates.

It will be noted that in the case of a wide input pulse the second and following positive half cycles of the damped wave 78 cannot open up the tube 67 to pass signal even if a back edge pulse is coincident with one of these half cycles because the cathode will be held positive by the voltage wave 76, 76′.

Thus the circuit of Fig. 7, like the previously described circuits, will pass pulses having widths falling between two limits and will exclude pulses narrower than the lower limit or wider than the upper limit.

What I claim as my invention is:

1. A pulse width discriminator circuit to the input circuit of which pulses of different widths may be applied, a coincidence circuit, means for differentiating said pulses to produce differentiated pulses that include back edge pulses, means for applying said back edge pulses to said coincidence circuit with such polarity as to tend to make it pass signal, means for producing a delayed control pulse in response to the occurrence of the front edge of said applied pulses which control pulse has an effective duration that is coincident with the back edges of the pulses of the widths to be passed by the coincidence circuit, means for applying said control pulse to said coincidence circuit with such polarity as to make it tend to pass said back edge pulses, means for also applying to said coincidence circuit the different width input pulses with such polarity and amplitude as to hold said coincidence circuit non-conducting, and means comprising a reflecting delay line to which said last mentioned pulses are applied, the non-reflecting end of said delay line being connected to said coincidence circuit to apply the reflected pulses thereto with such polarity and amplitude as hold the coincidence circuit non-conducting, the time required for a pulse to travel down the delay line and back being substantially equal to but slightly greater than the duration of the widest input pulse that is to be passed by the coincidence circuit.

2. A pulse width discriminator circuit to the input circuit of which pulses of different widths may be applied, a coincidence circuit, means for differentiating said pulses to produce differentiated pulses that include back edge pulses, means for applying said back edge pulses to said coincidence circuit with such polarity as to tend to make it pass signal, means comprising a ringing circuit for producing a delayed control pulse in response to the occurrence of the front edge of said applied pulses which control pulse has an effective duration that is coincident with the back edges of the pulses of the widths to be passed by the coincidence circuit, means for applying said control pulse to said coincidence circuit with such polarity as to make it tend to pass said back edge pulses, means for also applying to said coincidence circuit the different width input pulses with such polarity and amplitude as to hold said coincidence circuit non-conducting, and means comprising a reflecting delay line to which said last mentioned pulses are applied, the non-reflecting end of said delay line being connected to said coincidence circuit to apply the reflected pulses thereto with such polarity and amplitude as hold the coincidence circuit non-conducting, the time required for a pulse to travel down the delay line and back being substantially equal to but slightly greater than the duration of the wides input pulse that is to be passed by the coincidence circuit.

3. A pulse width discriminator circuit to the input circuit of which pulses of different widths may be applied, a coincidence circuit, means for differentiating said pulses to produce differentiated pulses that include back edge pulses, means for applying said back edge pulses to said coincidence circuit with such polarity as to tend to make it pass signal, means comprising an open-ended delay line for producing a delayed control pulse in response to the occurrence of the front edge of said applied pulses which control pulse has an effective duration that is coincident with the back edges of the pulses of the widths to be passed by the coincident circuit, means for applying said control pulse to said coincidence circuit with such polarity as to make it tend to pass said back edge pulses, means for also applying to said coincidence circuit the different width input pulses with such polarity and amplitude as to hold said coincidence circuit non-conducting, and means comprising a reflecting delay line to which said last mentioned pulses are applied, the non-reflecting end of said delay line being also connected to said coincidence circuit to apply the reflected pulses thereto with such polarity and amplitude as hold the coincidence circuit non-conducting, the amount of the delay of a pulse down the delay line and back being substantially equal to but slightly greater than the duration of the widest input pulse that is to be passed by the coincidence circuit.

4. A pulse width discriminator circuit to which pulses of different widths may be applied, said circuit comprising a coincidence tube having a cathode, an anode and a plurality of control grids, means for differentiating said applied pulses and for applying the resulting differentiated pulses to one of said grids of said coincidence tube with the differentiated back edge pulses of positive polarity, means including a reflecting delay line for producing a delayed control pulse in response to the occurrence of each of said applied pulses which control pulse has a predetermined effective duration, means for applying said control pulse to another of said control grids with positive polarity, means for applying said different width pulses to said cathode with positive polarity, and an open-ended delay line connected to the cathode circuit of said coincidence tube, said coincidence tube being so biased that it passes signal only when a differentiated back edge pulse and said control pulse are coincident and when no pulse voltage is being applied to said cathode.

5. A pulse width discriminator circuit having an input circuit to which pulses of different widths may be applied, said circuit comprising a coincidence tube having a cathode, an anode and a control grid, means for differentiating said applied pulses and for applying the resulting differentiated back edge pulses to said control grid with positive polarity, means comprising a tuned circuit to which said grid is connected for producing a positive polarity control pulse in response to the occurrence of the front edge of each of said applied pulses, said last means comprising a differentiating circuit and comprising a primary coil coupled to said tuned circuit, and further comprising a rectifier through which said last-mentioned differentiating circuit is connected to said primary coil, means for applying said different width pulses to said cathode with positive polarity, and an open-ended delay line connected to the cathode circuit of said coincidence tube, said coincidence tube being so biased that it passes signal only when a differentiated back edge pulse and said control pulse are coincident and when no pulse voltage is being applied to said cathode.

EVERETT EBERHARD.

References Cited in the file of this patent

UNITED STATES PATENTS

| Number | Name | Date |
|---|---|---|
| 2,418,127 | Labin | Apr. 1, 1947 |
| 2,437,313 | Bedford | Mar. 9, 1948 |
| 2,468,058 | Grieg | Apr. 26, 1949 |
| 2,484,352 | Miller et al. | Oct. 11, 1949 |
| 2,493,648 | Watton | Jan. 3, 1950 |
| 2,556,074 | Eberhard | June 5, 1951 |